United States Patent
Hwang et al.

(10) Patent No.: US 8,489,027 B2
(45) Date of Patent: Jul. 16, 2013

(54) METHOD AND APPARATUS FOR COMMUNICATING SOUND WAVE OF HUMAN BODY

(75) Inventors: Jung Hwan Hwang, Daejeon (KR); Sung Weon Kang, Daejeon (KR); Hyung Il Park, Daejeon (KR); In Gi Lim, Daejeon (KR); Tae Wook Kang, Daejeon (KR); Kyung Soo Kim, Daejeon (KR); Jung Bum Kim, Daejeon (KR); Chang Hee Hyoung, Daejeon (KR); Jin Kyung Kim, Daejeon (KR); Sung Eun Kim, Seoul (KR); Duck Gun Park, Daejeon (KR); Ki Hyuk Park, Daejeon (KR); Jae Hoon Shim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 560 days.

(21) Appl. No.: 12/671,496

(22) PCT Filed: May 30, 2008

(86) PCT No.: PCT/KR2008/003044
§ 371 (c)(1),
(2), (4) Date: Jan. 29, 2010

(87) PCT Pub. No.: WO2009/017300
PCT Pub. Date: Feb. 5, 2009

(65) Prior Publication Data
US 2010/0197225 A1 Aug. 5, 2010

(30) Foreign Application Priority Data

Aug. 1, 2007 (KR) .................. 10-2007-0077504
Sep. 27, 2007 (KR) .................. 10-2007-0097582

(51) Int. Cl.
*H04B 7/00* (2006.01)

(52) U.S. Cl.
USPC ........ 455/41.3; 455/41.1; 455/41.2; 704/229; 370/338; 340/572.1

(58) Field of Classification Search
USPC ............... 455/41.1, 41.3; 704/229; 370/338; 340/572.1
See application file for complete search history.

(56) References Cited

U.S. PATENT DOCUMENTS

| 2001/0002924 A1 | 6/2001 | Tajima |
| 2004/0202339 A1 | 10/2004 | O'Brien, Jr. et al. |

(Continued)

FOREIGN PATENT DOCUMENTS

| JP | 2001-177480 A | 6/2001 |
| JP | 2001-190696 A | 7/2001 |

(Continued)

OTHER PUBLICATIONS

International Search Report for PCT/KR2008/003044, filed May 30, 2008.

(Continued)

*Primary Examiner* — April G Gonzales (57) ABSTRACT

A method and apparatus for communicating a sound wave is provided. The apparatus includes: a sound wave converter converting a sound wave signal transmitted from a counter apparatus through the human body into an electrical signal when the sound wave is transmitted from the counter apparatus through the human body and converting an electrical signal on data to be output to the counter apparatus into a sound wave; a data processor receiving the converted electrical signal from the sound wave converter and transmitting an electrical signal on the data to be output to the sound wave converter when the data to be output exists; and a switch connected between the sound wave converter and the data processor, the switch transmitting the converted electrical signal to the data processor and transmitting the electrical signal on the data to be output to the sound wave converter. Accordingly, it is possible to efficiently transmit a signal with a low loss of sound wave signal. Thus, it is possible to simply construct communication hardware at a low price.

11 Claims, 5 Drawing Sheets

U.S. PATENT DOCUMENTS

| | | |
|---|---|---|
| 2005/0249234 A1 | 11/2005 | Kodama et al. |
| 2006/0092908 A1 | 5/2006 | Sung et al. |
| 2006/0143004 A1* | 6/2006 | Kim et al. .................... 704/229 |
| 2006/0252371 A1 | 11/2006 | Yanagida |
| 2007/0002815 A1* | 1/2007 | Ishibashi et al. ............. 370/338 |

FOREIGN PATENT DOCUMENTS

| | | |
|---|---|---|
| JP | 2001-268018 A | 9/2001 |
| JP | 2004-048543 A | 2/2004 |
| JP | 2004-266734 A | 9/2004 |
| JP | 2006-340284 A | 12/2006 |
| KR | 1020050014243 A | 2/2005 |

OTHER PUBLICATIONS

Written Opinion of the International Searching Authority for PCT/KR2008/003044, filed May 30, 2008.

* cited by examiner

METHOD AND APPARATUS FOR COMMUNICATING SOUND WAVE OF HUMAN BODY

TECHNICAL FIELD

The present invention relates to a method and apparatus for communicating a sound wave of a human body, and more particularly, to a method and apparatus for communicating data among apparatuses contacting the human body by converting an electrical signal into a sound signal and transmitting the sound signal through the human body.

The present invention was supported by the IT R&D program of MIC/IITA[2006-S-072-02, Controller SoC for Human Body Communications].

BACKGROUND ART

In a modern society, many people always carry devices such as PDAs, mobile phones, medical devices, and the like. Methods of transmitting a signal for communicating data among information terminal devices includes wired transmission methods using cables and wireless transmission methods using waves, light, and the like.

In the wired transmission methods, a security level of transmitted data and a transmission speed of data are high. However, wired devices such as cables have to be always carried. On the other hand, the wireless transmission methods are convenient to transmit data. However, a complex hardware structure is necessary so as to wirelessly transmit data. Accordingly, it is difficult to reduce a price of wireless transmission devices.

Accordingly, a technique of communicating data with a simple hardware structure is necessary.

DISCLOSURE OF INVENTION

Technical Problem

The present invention provides a method and apparatus for communicating a sound wave of a human body capable of simply and efficiently communicating data among apparatuses contacting the human body by using a phenomenon of transmitting the sound wave through the human body.

Technical Solution

According to an aspect of the present invention, there is provided an apparatus for communicating a sound wave of a human body, the apparatus comprising: a sound wave converter converting a sound wave signal transmitted from a counter apparatus through the human body into an electrical signal when the sound wave is transmitted from the counter apparatus through the human body and converting an electrical signal on data to be output to the counter apparatus into a sound wave; a data processor receiving the converted electrical signal from the sound wave converter and transmitting an electrical signal on the data to be output to the sound wave converter when the data to be output exists; and a switch connected between the sound wave converter and the data processor, the switch transmitting the converted electrical signal to the data processor and transmitting the electrical signal on the data to be output to the sound wave converter.

According to another aspect of the present invention, there is provided a method of communicating a sound wave of a human body with a counter apparatus through the human body in an apparatus for communicating the sound wave of the human body including a sound wave converter connected to an input/output unit contacting the human body, a data processor, and a switch connected between the sound wave converter and the data processor, the method comprising: converting the sound wave into an electrical signal by using the sound wave converter when receiving a sound wave signal transmitted from the counter apparatus through the human body by using the input/output unit; and transmitting the converted electrical signal from the sound wave converter to the data processor through the switch when the switch is connected to an input port of the data processor.

According to another aspect of the present invention, there is provided a method of communicating a sound wave of a human body with a counter apparatus through the human body by using an apparatus for communicating the sound wave of the human body including a sound wave converter connected to an input/output unit contacting the human body, a data processor, and a switch connected between the sound wave converter and the data processor, the method comprising: transmitting an electrical signal on the data to the sound wave converter through the switch connected to an output port when data to be output to the counter apparatus exists in the data processor; converting the transmitted electrical signal into a sound wave by using the sound wave converter; and applying the sound wave signal converted by the sound wave converter to the human body.

Advantageous Effects

As described above, in the present invention, data is communicated by transmitting a sound signal through a human body. Accordingly, it is possible to efficiently transmit a signal with a low loss of sound wave signal. Thus, it is possible to simply construct communication hardware at a low price.

BEST MODE FOR CARRYING OUT THE INVENTION

The present invention will now be described more fully with reference to the accompanying drawings, in which exemplary embodiments of the invention are shown. In the description of the present invention, if it is determined that a detailed description of commonly-used technologies or structures related to the invention may unnecessarily obscure the subject matter of the invention, the detailed description will be omitted.

A data communication through the human body is referred to as communication of a sound wave of a human body.

The sound wave signal has a low signal loss in the human body. That is, in case of muscle tissues which occupy most of the human body, the sound wave signal has a signal loss ratio of about 1.2 dB/cm. Accordingly, in a case where the sound wave signal is transmitted through the human body, it is possible to communicate data with a low signal loss. It is possible to construct an apparatus for communicating the sound wave of the human body. Communication of data through the human body and a structure of an apparatus for communicating a sound wave of the human body according to a first embodiment of the present invention will be described with reference to the accompanying drawings.

Figure 1:
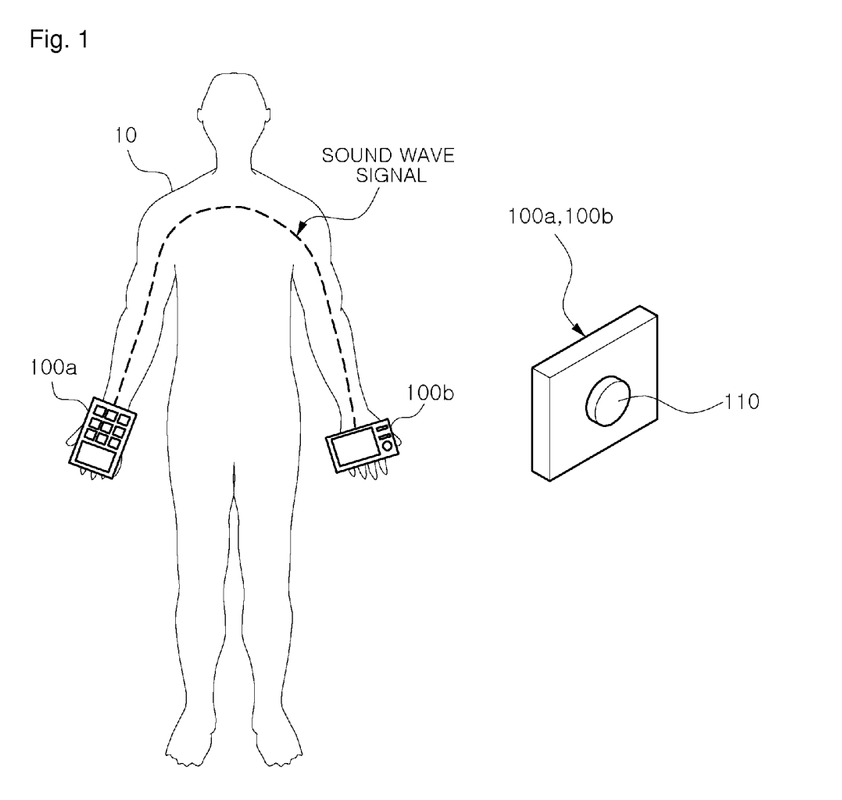
FIG. 1 illustrates data communication through a human body according to embodiments of the present invention.
Figure 2:
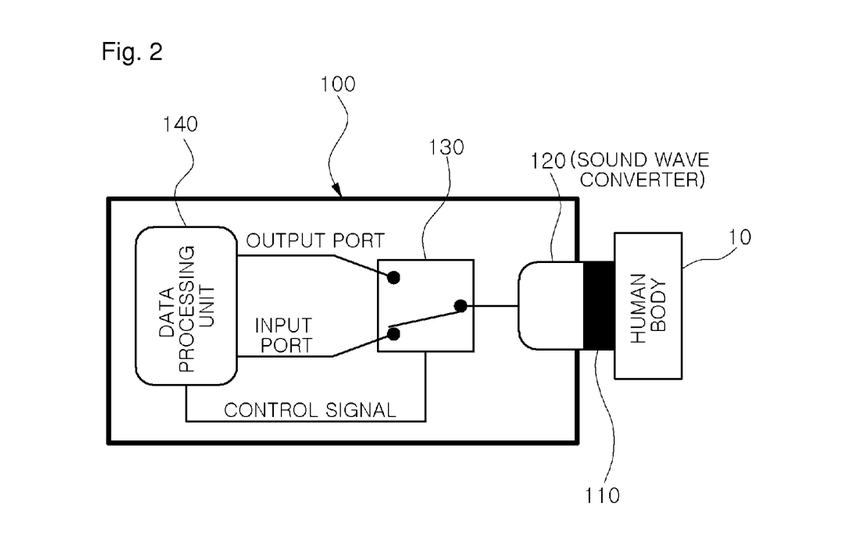
FIG. 2 is a block diagram illustrating a structure of an apparatus for communicating a sound wave of a human body according to a first embodiment of the present invention.

FIG. 1 illustrates data communication through a human body according to embodiments of the present invention. FIG. 2 is a block diagram illustrating the structure of the apparatus for communicating the sound wave of the human body according to the first embodiment of the present invention.

As shown in FIG. 1, in order to communicate data through a human body 10, at least two apparatuses 100a and 100b for communicating a sound wave of a human body may contact the human body 10. The apparatuses 100a and 100b for communicating a sound wave of the human body convert an electrical signal into a sound wave signal or convert a sound wave into an electrical signal, and transmit the sound signal to each other through the human body so as to communicate data.

Referring to FIG. 2, the apparatus for communicating the sound wave of the human body according to the first embodiment of the present invention may be constructed with an input/output unit 110 for inputting/outputting a signal by contacting the human body 10, a sound wave converter 120 for converting the input/output signal, a switch 130, and a data processor 140 for processing the input/output data.

The sound wave converter 120 connected to the input/output unit 110 converts an electrical signal of the output data into a sound wave, applies the sound signal to the human body 10, and converts the sound wave transmitted through the human body 10 into an electrical signal. Here, the sound wave signal applied to the human body 10 is transmitted from a part of the human body which contacts a first apparatus 100a for communicating the sound wave of the human body to a part of the human body which contacts a second apparatus 100b for communicating the sound wave of the human body and input into the second apparatus for communicating the sound wave of the human body. Since the input sound wave signal is converted into an electrical signal, again, data is communicated between the first and second apparatuses 100a and 100b for communicating the sound wave of the human body.

The switch 130 is connected to the sound wave converter 120 and input and output ports of the data processor 140. The switch 130 switches the input/output data by changing the switch 130 to the input port or output port in response to a control signal generated by the data processor 140.

In a case where there is data to be transmitted, the data processor 140 outputs a data signal having an analog or digital form to the output port in an electrical signal form. At this time, the data processor 140 generates a control signal and changes the switch 130 so as to connect the output port to the sound wave converter 120. In addition, in a case where there is a sound wave signal to be transmitted through the human body 10, the data processor 140 generates a control signal and changes the switch 130 so as to connect the data processor 140 to the input port. The sound wave converter 120 receives the converted electrical signal.

The apparatus for communicating the sound wave of the human body according to the first embodiment of the present invention communicates data through the human body. Data communication through the human body, that is, a method of communicating the sound wave of the human body will be described in detail with reference to the accompanying drawings.

Figure 3:
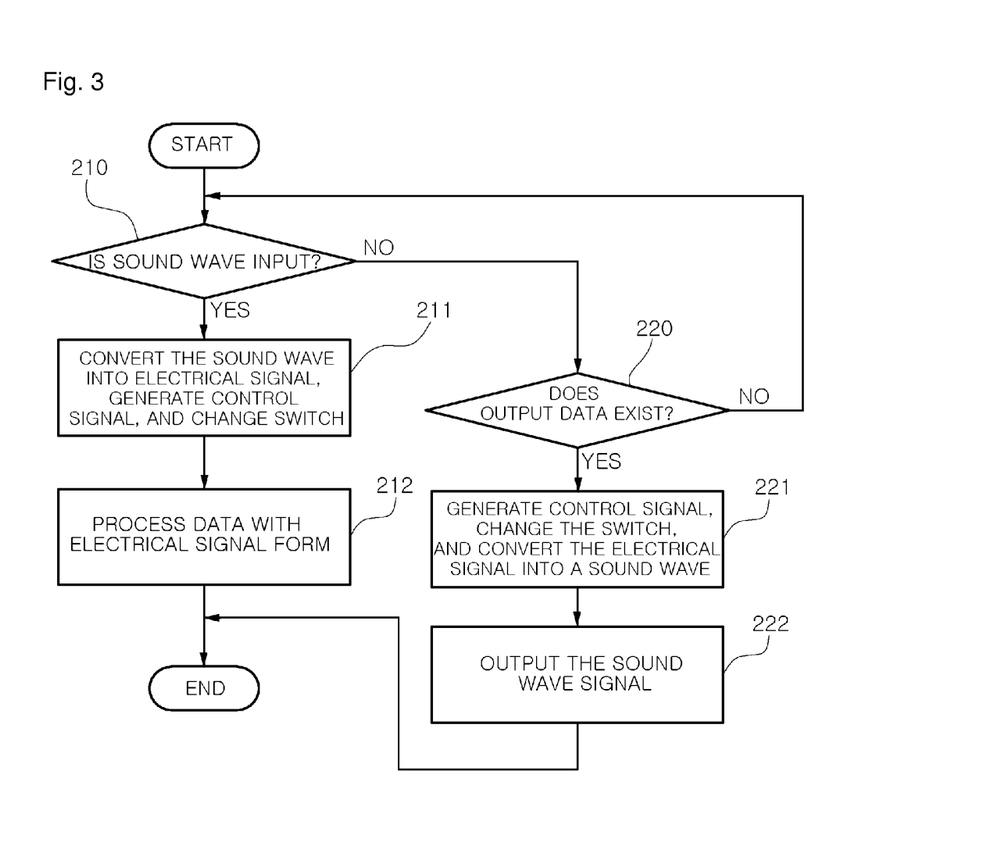
FIG. 3 is a flowchart illustrating a method of communicating a sound wave of a human body by using the apparatus for communicating a sound wave of a human body according to the first embodiment of the present invention.

FIG. 3 is a flowchart illustrating a method of communicating the sound wave of the human body by using the apparatus for communicating the sound wave of the human body according to the first embodiment of the present invention.

Referring to FIG. 3, in a case where in operation 210, the sound signal is transmitted from a human body 10 and input into the apparatus 100 for communicating the sound wave of the human body 10 through the input/output unit 110, in operation 211, the apparatus 100 for communicating the sound wave of the human body 10 converts the sound wave into an electrical signal and generates a control signal from the data processor 140 to the switch 130, at the same time. Accordingly, the apparatus 100 for communicating the sound wave of the human body 10 changes the switch to the input port. In operation 212, the apparatus 100 for communicating the sound wave of the human body transmits the electrical signal to the data processor 140 through the input port. The data processor 140 processes the transmitted electrical signal.

On the other hand, in a case where in operation 210, there is no input sound wave signal, in operation 220, the apparatus 100 for communicating the sound wave of the human body checks whether output data exists in the data processor 140. When it is checked that the output data exists, in operation 221, the apparatus 100 for communicating the sound wave of the human body generates a control signal from the data processor 140 to the switch 130, changes the switch 130 to the output port, and converts the output data having an electrical signal form into a sound signal. Then, in operation 222, the apparatus 100 for communicating the sound wave of the human body 100 applies the converted sound wave signal to the human body 10.

As described above, in the first embodiment of the present invention, the method and apparatus for communicating the sound wave of the human body by using a structure in which the switch is directly connected to the input and output ports was described. In a second embodiment of the present invention, a method and apparatus for communicating a sound wave of a human body by using a structure which modulates/demodulates input/output data will be described in detail with reference to the accompanying drawings.

Figure 4:
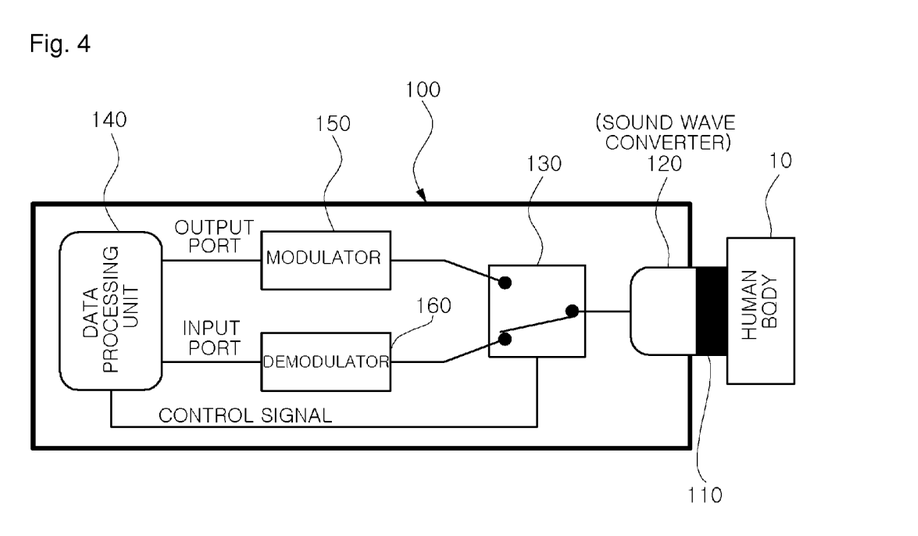
FIG. 4 is a block diagram illustrating a structure of an apparatus for communicating a sound wave of a human body according to a second embodiment of the present invention.

FIG. 4 is a block diagram illustrating a structure of an apparatus for communicating a sound wave of a human body according to a second embodiment of the present invention.

Referring to FIG. 4, the apparatus for communicating the sound wave of the human body according to the second embodiment of the present invention may be constructed with an input/output unit 110 for inputting/outputting a signal by contacting the human body 10, a sound wave converter 120 for converting the input/output signal, a switch 130, a data processor 140 for processing the input/output data, an modulator 150 for modulating input/output data, and a demodulator 160 for demodulating input/output data. Since functions of the sound wave converter 120, the switch 130, and the data processor 140 are the same as those in the first embodiment of the present invention, detailed description on them will be omitted.

The modulator 150 is located between an output port of the data processor 140 and the switch 130 so as to modulate data having an electrical signal form which is output from the data processor 140 into a signal having a waveform or frequency which is most suitable to be transmitted through the human body.

The demodulator 160 is located between an input port of the data processor 140 and the switch 130 so as to demodulate data of the electrical signal which is output from the sound wave modulator 130 into a signal having an original analog or digital form and transmit the demodulated data to the data processor 140.

The apparatus for communicating the sound wave of the human body according to the second embodiment of the present invention communicates data through the human body. Data communication through the human body, that is, a method of communicating the sound wave of the human body will be described in detail with reference to the accompanying drawings.

Figure 5:
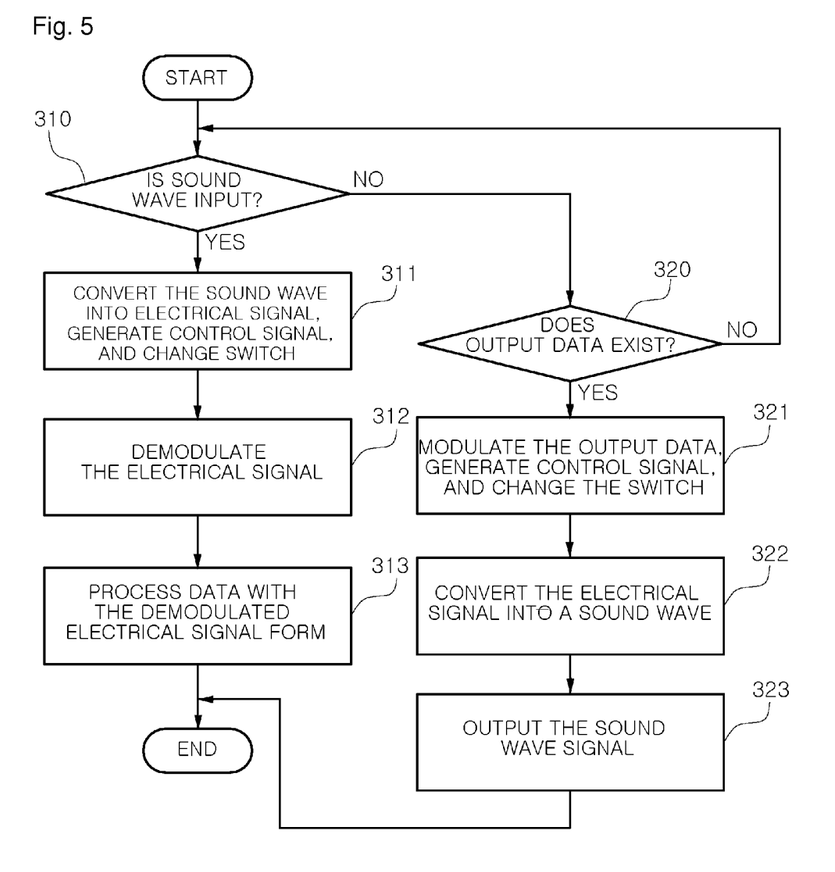
FIG. 5 is a flowchart illustrating a method of communicating a sound wave of a human body by using the apparatus for communicating a sound wave of a human body according to the second embodiment of the present invention.

FIG. 5 is a flowchart illustrating a method of communicating a sound wave of a human body by using the apparatus for communicating a sound wave of a human body according to the second embodiment of the present invention.

Referring to FIG. 5, in a case where in operation 310, a sound signal is transmitted from a human body 10 and input into the apparatus 100 for communicating the sound wave of the human body 10 through the input/output unit 110, in operation 311, the apparatus 100 for communicating the sound wave of the human body 10 converts the sound wave into an electrical signal. At the same time, the apparatus 100 for communicating the sound wave of the human body 10 generates a control signal from the data processor 140 to the switch 130 so as to change the switch 130 to the demodulator 160. After the data is demodulated, in operation 313, the apparatus 100 for communicating the sound wave of the human body 10 transmits data of the demodulated electrical signal to the data processor 140 through the input port. The data processor 140 processes the demodulated data.

On the other hand, in a case where in operation 310, there is no input sound wave signal, in operation 320, the apparatus 100 for communicating the sound wave of the human body checks whether output data exists in the data processor 140. When it is checked that the output data exists, in operation 321, the apparatus 100 for communicating the sound wave of the human body demodulates data that is output from the data processor 140, generates a control signal from the data processor 140 to the switch 130, and changes the switch 130 to the output port.

Then, in operation 322, the apparatus 100 for communicating the sound wave of the human body 100 converts the output data having an electrical signal form into a sound signal. In operation 323, the apparatus 100 for communicating the sound wave of the human body 100 applies the converted sound wave signal to the human body 10.

As described above, in the apparatus for communicating a sound wave of a human body according to an embodiment of the present invention, since it is possible to communicate data among apparatuses for communicating a sound wave of a human body contacting the human body by converting an electrical signal into a sound wave and transmitting the converted sound wave signal through the human body, it is possible to efficiently transmit a signal with a low signal loss and simply construct communication hardware.

In addition, since the sound wave converter according to an embedment of the present invention may be embodied to have a small size by using a piezoelectric technique, it is possible to miniaturize subsidiary circuits of the apparatus for communicating the sound wave of the human body and allow the subsidiary circuits to have low power consumption by using a system on chip (SoC) technique. In addition, it is possible to easily mount the subsidiary circuits on an existing information terminal device.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. An apparatus for transmitting a sound wave through a human body, the apparatus comprising:
   a sound wave converter converting a sound wave signal transmitted from a counter apparatus through the human body into an electrical signal when the sound wave is transmitted from the counter apparatus through the human body and converting an electrical signal on data to be output to the counter apparatus into a sound wave;
   a data processor receiving the converted electrical signal from the sound wave converter and transmitting the electrical signal on data to be output to the sound wave converter when data to be output exists; and
   a switch connected between the sound wave converter and the data processor, the switch transmitting the converted electrical signal to the data processor and transmitting the electrical signal on data to be output to the sound wave converter.

2. The apparatus of claim 1, wherein when receiving the sound wave signal, the data processor generates a control signal to the switch and connects the switch to an input port of the data processor, and when the data to be output exists, the data processor generates a control signal to the switch and connects the switch to the input port of the data processor.

3. The apparatus of claim 1, further comprising an input/output unit receiving the sound signal transmitted from the counter apparatus through the human body, transmitting the received sound wave signal to the sound wave converter, and applying the sound wave signal converted by the sound wave converter to the human body.

4. The apparatus of claim 1, further comprising a modulator connected between the data processor and the switch, the modulator modulating the electrical signal on the output data transmitted from the data processor.

5. The apparatus of claim 1, further comprising a demodulator connected between the data processor and the switch, the demodulator demodulating the converted electrical signal transmitted from the sound wave converter.

6. A method of transmitting a sound wave through a human body to a counter apparatus by using an apparatus for transmitting the sound wave through the human body including a sound wave converter connected to the human body, a data processor, and a switch connected between the sound wave converter and the data processor, the method comprising:
   converting the sound wave signal into an electrical signal by using the sound wave converter when receiving a sound wave signal transmitted from the counter apparatus through the human body; and
   transmitting the converted electrical signal from the sound wave converter to the data processor through the switch when the switch is connected to an input port of the data processor.

7. The method of claim 6, further comprising generating a control signal to the switch and connecting the switch to the input port when the sound wave signal is transmitted from the data processor to the sound wave converter.

8. The method of claim 7, further comprising demodulating the electrical signal transmitted to the data processor through the demodulator connected to the input port of the data processor by the switch.

9. A method of communicating a sound wave of a human body with a counter apparatus through the human body in an apparatus for communicating the sound wave of the human body including a sound wave converter connected to the human body, a data processor, and a switch connected between the sound wave converter and the data processor, the method comprising:

- transmitting an electrical signal on data to the sound wave converter through the switch connected to an output port when data to be output to the counter apparatus exists in the data processor;
- converting the transmitted electrical signal into a sound wave by using the sound wave converter; and
- applying the sound wave signal converted by the sound wave converter to the human body.

10. The method of claim 9, further comprising generating a control signal to the switch and connecting the switch to the output port when the data exists in the data processor.

11. The method of claim 10, further comprising demodulating the electrical signal transmitted to the sound wave converter through a demodulator connected to the output port of the data processor by the switch.

\* \* \* \* \*